United States Patent
Hara et al.

(10) Patent No.: US 11,558,000 B2
(45) Date of Patent: Jan. 17, 2023

(54) MOTOR CONTROL DEVICE AND ELECTRIC VEHICLE SYSTEM USING THE SAME

(71) Applicant: Hitachi Astemo, Ltd., Hitachinaka (JP)

(72) Inventors: Takafumi Hara, Tokyo (JP); Toshiyuki Ajima, Tokyo (JP); Akihiro Ashida, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/965,147

(22) PCT Filed: Jan. 24, 2019

(86) PCT No.: PCT/JP2019/002181
§ 371 (c)(1),
(2) Date: Jul. 27, 2020

(87) PCT Pub. No.: WO2019/163384
PCT Pub. Date: Aug. 29, 2019

(65) Prior Publication Data
US 2021/0044243 A1 Feb. 11, 2021

(30) Foreign Application Priority Data
Feb. 21, 2018 (JP) .............................. JP2018-028963

(51) Int. Cl.
*H02P 27/08* (2006.01)
*H02M 1/44* (2007.01)
(Continued)

(52) U.S. Cl.
CPC ............ *H02P 27/085* (2013.01); *H02M 1/44* (2013.01); *H02P 23/28* (2016.02); *H02M 7/5395* (2013.01)

(58) Field of Classification Search
CPC ........ H02P 27/085; H02P 23/28; H02M 1/44; H02M 7/5395
See application file for complete search history.

(56) References Cited

U.S. PATENT DOCUMENTS

| | | | |
|---|---|---|---|
| 7,567,048 B2* | 7/2009 | Shin ........................ | H02M 1/12 318/400.24 |
| 7,923,961 B2* | 4/2011 | Takamatsu .............. | H02P 27/08 318/811 |

(Continued)

FOREIGN PATENT DOCUMENTS

| | | |
|---|---|---|
| EP | 2 073 374 A1 | 6/2009 |
| JP | 63-190594 A | 8/1988 |

(Continued)

OTHER PUBLICATIONS

International Search Report (PCT/ISA/210) issued in PCT Application No. PCT/JP2019/002181 dated May 28, 2019 with English translation (four (4) pages).

(Continued)

*Primary Examiner* — Rina I Duda
(74) *Attorney, Agent, or Firm* — Crowell & Moring LLP

(57) ABSTRACT

An object of the present invention is to provide a motor control device that can suppress electromagnetic noises including a switching noise and to an electric vehicle system using the motor control device. A motor control device includes: a power converter that is controlled by a pulse width modulation signal; a motor that is driven by the power converter; and a controller that generates the pulse width modulation signal, based on a carrier signal. When switching between a first carrier frequency (fc1) of the carrier signal and a second carrier frequency (fc2) of the carrier signal, the controller varies proportions of the first carrier frequency and the second carrier frequency in accordance (Continued)

with a number of rotations of the motor, the second carrier frequency being higher than the first carrier frequency.

16 Claims, 13 Drawing Sheets

(51) Int. Cl.
*H02P 23/28* (2016.01)
*H02M 7/5395* (2006.01)

(56) References Cited

U.S. PATENT DOCUMENTS

| | | | | |
|---|---|---|---|---|
| 8,348,020 | B2* | 1/2013 | Ohya | B66B 1/304 |
| | | | | 187/289 |
| 2004/0207360 | A1 | 10/2004 | Matsushiro et al. | |
| 2006/0072658 | A1* | 4/2006 | Yasuda | H03F 3/217 |
| | | | | 375/238 |
| 2010/0013422 | A1* | 1/2010 | Ikei | H02P 29/032 |
| | | | | 318/400.13 |
| 2013/0049666 | A1 | 2/2013 | Osugi | |
| 2013/0063058 | A1* | 3/2013 | Shouji | H02P 21/22 |
| | | | | 318/400.06 |
| 2014/0103843 | A1* | 4/2014 | Bae | H02M 7/537 |
| | | | | 318/400.25 |
| 2014/0239861 | A1* | 8/2014 | Ajima | H02P 6/10 |
| | | | | 318/400.17 |
| 2014/0354191 | A1* | 12/2014 | Nakazu | H02P 6/28 |
| | | | | 318/3 |
| 2016/0094177 | A1* | 3/2016 | Shimomugi | H02P 27/085 |
| | | | | 318/400.2 |
| 2016/0111951 | A1 | 4/2016 | Taniguchi et al. | |
| 2016/0329856 | A1* | 11/2016 | Shoda | H02P 27/085 |

FOREIGN PATENT DOCUMENTS

| | | | |
|---|---|---|---|
| JP | 2001-186787 | A | 7/2001 |
| JP | 2002-153096 | A | 5/2002 |
| JP | 2009-284719 | A | 12/2009 |
| JP | 2013-62933 | A | 4/2013 |
| JP | 2014-230472 | A | 12/2014 |
| JP | 2014-233178 | A | 12/2014 |
| JP | 2016-5370 | A | 1/2016 |

OTHER PUBLICATIONS

Japanese-language Written Opinion (PCT/ISA/237) issued in PCT Application No. PCT/JP2019/002181 dated May 28, 2019 (four (4) pages).
Extended European Search Report issued in European Application No. 19758058.2 dated Oct. 12, 2021 (13 pages).
Eri Zeze, et al., "Research on vibration analysis and noise-reduction technique of PM motor", Electrical Machines (ICEM), 2012 XXTH International Conference ON, IEEE, Sep. 2, 2012, pp. 458-463, XP032464758.

* cited by examiner

FIG. 6A
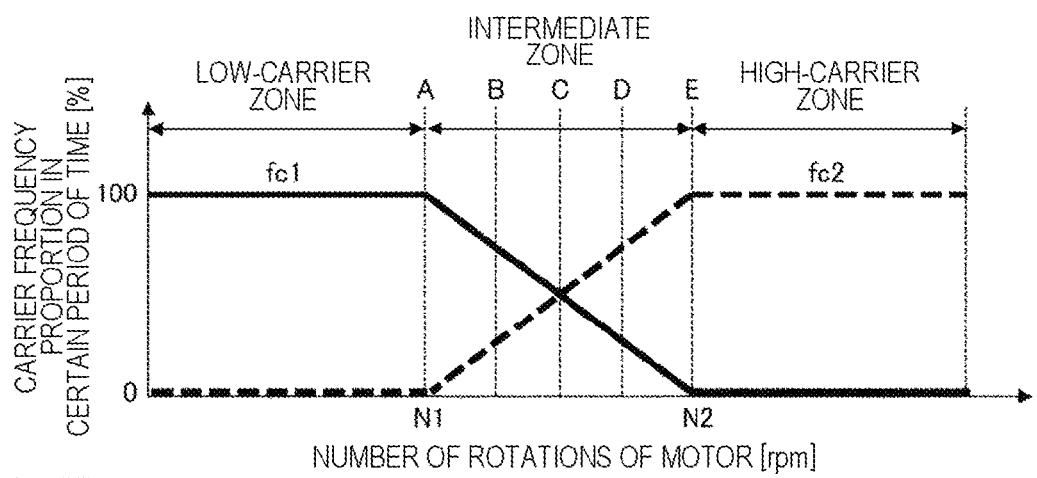
FIG. 6B
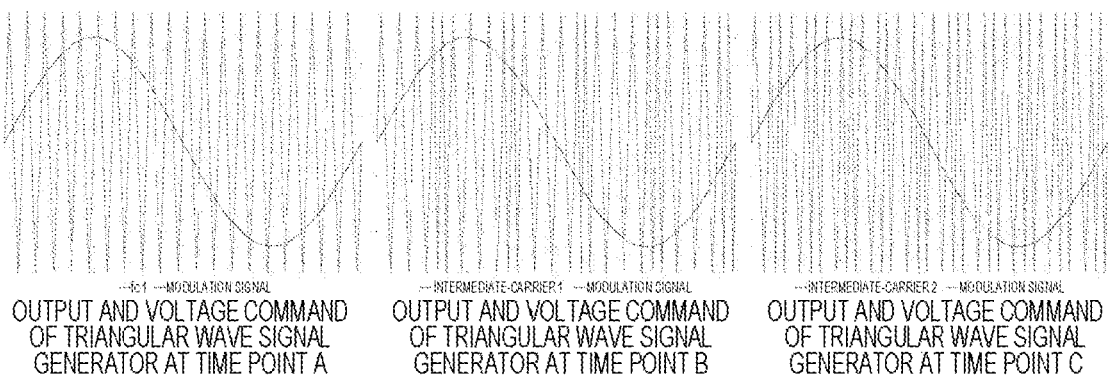
FIG. 6C
FIG. 6D

FIG. 7A
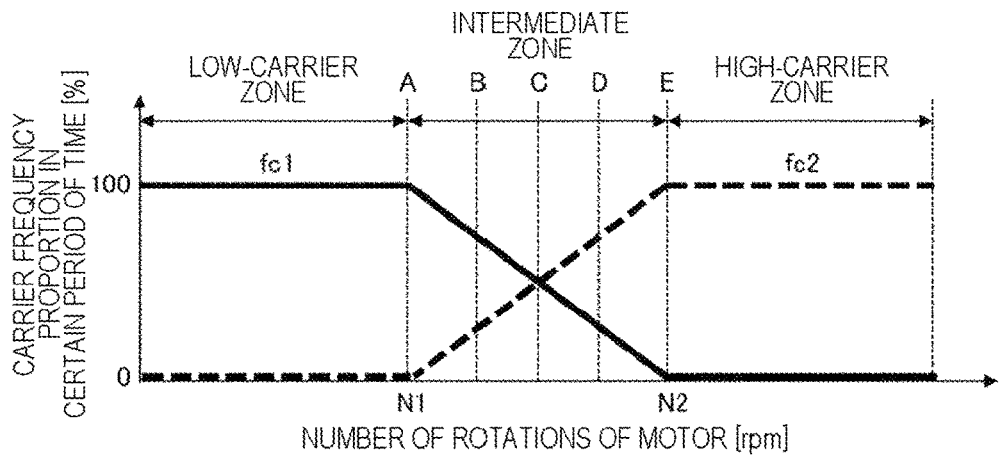
FIG. 7B
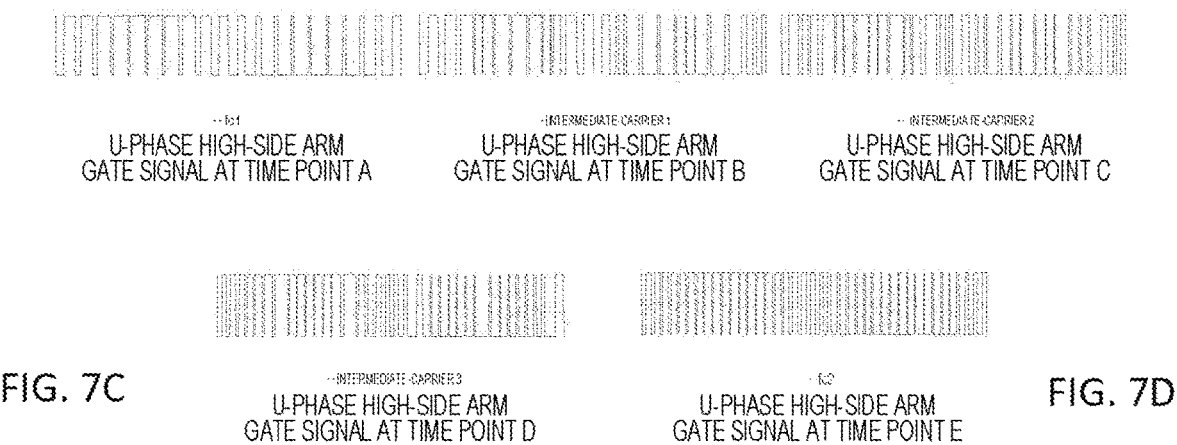
FIG. 7C    FIG. 7D
FIG. 8A    FIG. 8B
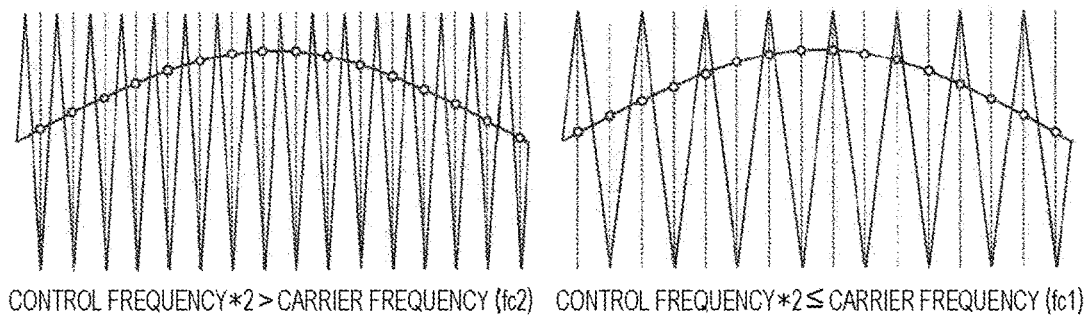
CONTROL FREQUENCY *2 > CARRIER FREQUENCY (fc2)    CONTROL FREQUENCY *2 ≤ CARRIER FREQUENCY (fc1)

MOTOR CONTROL DEVICE AND ELECTRIC VEHICLE SYSTEM USING THE SAME

TECHNICAL FIELD

The present invention relates to a motor control device that controls a motor by using an inverter and also to an electric vehicle system using the motor control device.

BACKGROUND ART

Motor control devices drive an alternating current (AC) motor by performing pulse width modulation (PWM) control of an inverter. In a motor control device, the inverter is PWM-switched to convert direct current (DC) power from a DC power supply into AC power with any given voltage and frequency. In this way, the AC motor is driven at variable speeds.

When the AC motor (referred to below simply as "motor") outputs a high torque with the number of rotations being low-speed, a switching frequency, called a carrier frequency, of the inverter decreases in order to prevent current from concentrating on a specific phase of the inverter. After the number of rotations of the motor steps out of a low-speed range, the carrier frequency of the inverter increases in order to reduce the power loss of the motor. As a result, the power loss of the entire system that includes the motor and the inverter is kept low, and the controllability of high-speed rotations is ensured.

Under the PWM control, a sinusoidal modulation signal is compared with a carrier signal in a sawtooth wave, triangular wave, or other waveform to generate a pulse voltage. In this case, electromagnetic force (electromagnetic excitation force) arising from the carrier frequency makes noise, referred to below as "carrier electromagnetic noise", in the motor and some other parts. Furthermore, to decrease or increase the carrier frequency as described above, the carrier frequency is switched and varied rapidly. This generates a three-phase current pulsation which is the cause of a noise (switching noise). If the frequency of this noise coincides with a mechanical natural frequency of the motor, the noise becomes louder.

With regard to the above, noise reduction techniques described in PTL 1 and PTL 2 are known.

In the technique described in PTL 1, it is determined whether the actual number of rotations Nm of a three-phase synchronous motor varies close to within a predetermined range with respect to the number of rotations Nr1 of a resonance motor. When the actual number of rotations Nm is close to within the predetermined range, the carrier frequency of the inverter is varied, and a second carrier frequency fc2 whose value differs from that of a first carrier frequency fc1 is set.

In the technique described in PTL 2, a carrier frequency is set to one of a maximum carrier frequency fmax and a minimum carrier frequency fmin, which are settable carrier frequencies, and a duration of the set frequency is randomly determined. As a result, the duration of the carrier wave with the same frequency differs every time, so that it is possible to reduce the switching noise, which is a component of an average frequency ($=2\text{fmin}\cdot\text{fmax}/(\text{fmin}+\text{fmax})$) in a carrier wave settable range.

CITATION LIST

Patent Literature

PTL 1: JP 2009-284719 A
PTL 2: JP 2014-230472 A

SUMMARY OF INVENTION

Technical Problem

In the technique of PTL 1, however, the frequencies of the first carrier frequency fc1 and the second carrier frequency fc2 differ from each other. Thus, it is impossible to suppress the switching noise arising from the three-phase current waveform pulsation. In the technique of PTL 2, the maximum and the minimum carrier frequencies co-reside. Thus, when the number of rotations of the motor is low-speed, a switching loss of semiconductor switching elements in the inverter excessively increases, in which case the semiconductor switching elements may be damaged.

The present invention provides a motor control device that can stably suppress electromagnetic noises including a switching noise, over a range of an operating speed of a motor and also provides an electric vehicle system using this motor control device.

Solution to Problem

To address the above problems, a control device according to the present invention includes: a power converter that is controlled by a pulse width modulation signal; a motor that is driven by the power converter; and a controller that generates the pulse width modulation signal, based on a carrier signal. When switching between a first carrier frequency of the carrier signal and a second carrier frequency of the carrier signal, the controller varies proportions of the first carrier frequency and the second carrier frequency in accordance with a number of rotations of the motor, the second carrier frequency being higher than the first carrier frequency.

To address the above problems, an electric vehicle system according to the present invention includes: a vehicle body; a wheel provided on the vehicle body; a drive power source that drives the wheel, the drive power source including a motor; a power converter that is controlled by a pulse width modulation signal and drives the motor; and a controller that generates the pulse width modulation signal, based on a carrier signal. When switching between a first carrier frequency of the carrier signal and a second carrier frequency of the carrier signal, the controller varies proportions of the first carrier frequency and the second carrier frequency in accordance with a number of rotations of the motor, the second carrier frequency being higher than the first carrier frequency.

Advantageous Effects of Invention

According to the present invention, it is possible to reduce a switching noise by varying proportions of first and second carrier frequencies.

Problems, configurations, and effects other than those described above will be clarified by the following description of embodiments.

BRIEF DESCRIPTION OF DRAWINGS

FIGS. 6A-6D illustrate an example of waveforms of a triangular wave carrier signal and a voltage command to be output from the triangular wave signal generator in FIG. 3.

FIGS. 7A-7D illustrate gate command signals generated with the triangular wave carrier signal and the voltage command illustrated in FIG. 6.

FIGS. 8A and 8B illustrate triangular wave signal waveforms, U-phase current waveforms, and current detection timings.

DESCRIPTION OF EMBODIMENTS

Figure 1:
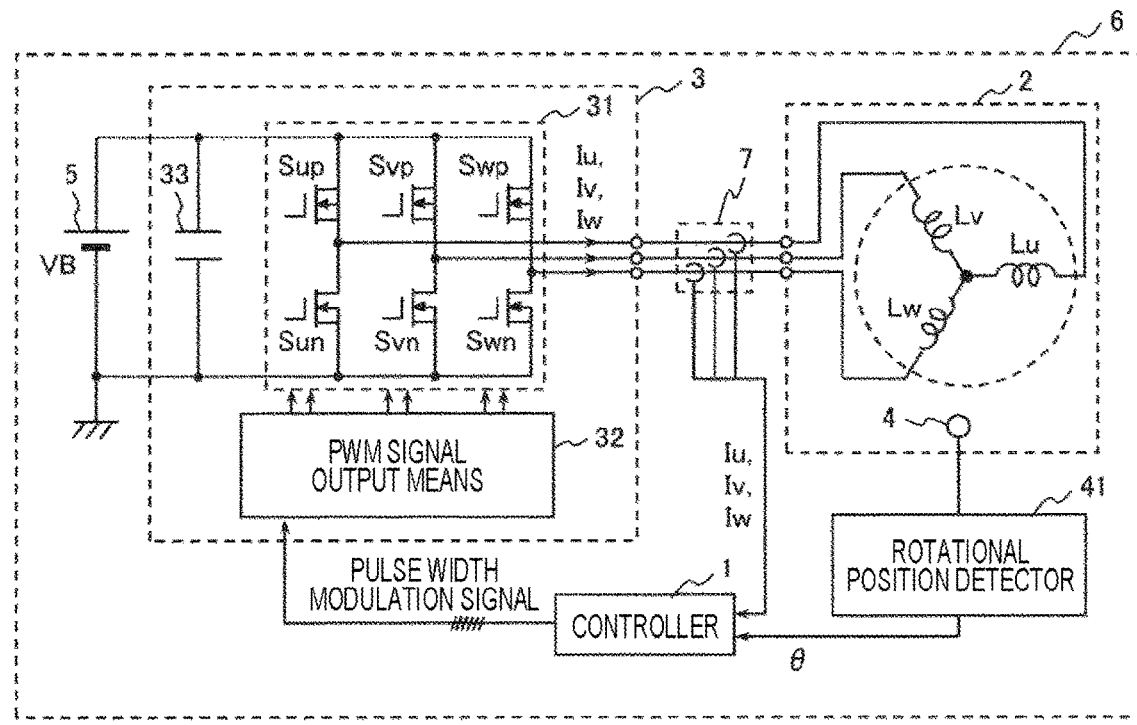
FIG. 1 illustrates a configuration of a motor control device according to Example 1.

Some embodiments of the present invention will be described below through Examples 1 to 5 below and with reference to the drawings. In each individual drawing, the same reference numerals denote identical constituent elements or constituent elements having similar functions.

Example 1

FIG. 1 illustrates a configuration of a motor control device according to Example 1 of the present invention.

A motor control device 6 includes a motor 2 and an inverter 3.

The inverter 3 includes: an inverter main circuit 31 that mutually converts a DC voltage into an AC voltage by using semiconductor switching elements Sup, Sun, Svp, Svn, Swp, and Swn; a pulse width modulation (PWM) signal output means 32 that outputs PWM signals to the inverter main circuit 31; and a smoothing capacitor 33 that smooths the DC power. In this example, a metal oxide field effect transistor (MOSFET) is used as each of the semiconductor switching elements Sup, Sun, Svp, Svn, Swp, and Swn. Alternatively, an insulated gate bipolar transistor (IGBT) or other element may be employed as each semiconductor switching element.

A high-voltage battery 5 is a DC voltage source in the motor control device 6. A DC voltage VB across the high-voltage battery 5 is converted into a pulsed, three-phase AC voltage with a variable voltage and a variable frequency by both the inverter main circuit 31 and the PWM signal output means 32 in the inverter 3, and then this three-phase AC voltage is applied to the motor 2.

The motor 2 is a three-phase synchronous motor (e.g., permanent magnet synchronous motor) to be rotationally driven by being supplied with the three-phase AC voltage. The motor 2 is provided with a rotational position sensor 4 for use in controlling a phase of the applied, three-phase AC voltage in accordance with a phase of a voltage induced by the motor 2.

A rotational position detector 41 calculates a rotational position θ from an input signal of the rotational position sensor 4.

The rotational position sensor 4 is preferably a resolver formed of an iron core and a winding; however, it may be a magnetic resistance element such as a giant magneto resistance (GMR) sensor or a sensor using a hall element. Alternatively, using a three-phase current or voltage of the motor may estimate the rotational position in a sensorless manner.

Current detection means 7 detects a U-phase AC Iu, a V-phase AC Iv, and a W-phase AC Iw, which are three-phase ACs flowing through the motor 2. In this case, the means provided with three current detectors is exemplified; however, two current detectors may be used, and the remaining one phase may be calculated based on the fact that the sum of the three-phase currents becomes zero. For example, a current transformer (CT) is employed as each current detector.

A pulsed DC bus current flowing into the inverter 3 is detected based on a voltage across a shunt resistor interposed between the smoothing capacitor 33 and the inverter 3, and the three-phase current value may be reproduced from a detected value of the DC bus current and in accordance with a vector of a voltage applied to the motor 2.

A controller 1 generates PWM signals, based on the rotational position θ detected by the rotational position detector 41 and the three-phase currents Iu, Iv, and Iw detected by the current detection means 7. Then, the controller 1 outputs the PWM signals to the PWM signal output means 32 (e.g., gate drive circuit).

The PWM signal output means 32 amplifies the PWM signals coming from the controller 1 and then gives the PWM signals to control terminals (gate terminals in this example) of the semiconductor switching elements Sup, Sun, Svp, Svn, Swp, and Swn. As a result, the turn-on or turn-off of each semiconductor switching element is controlled, and the DC power from the high-voltage battery 5 is converted into three-phase AC power.

Figure 2:
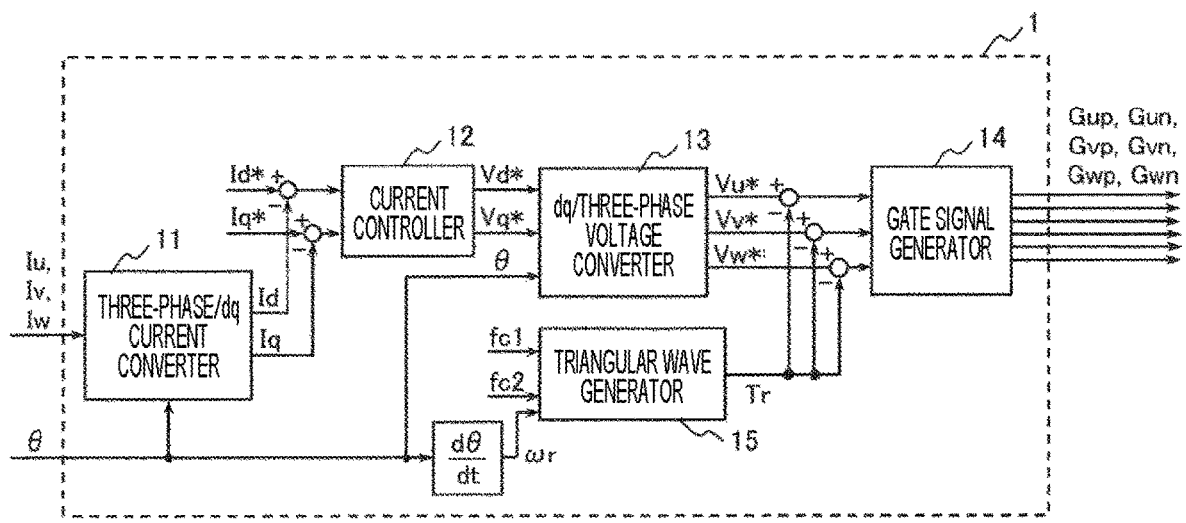
FIG. 2 is a block diagram of a configuration of a controller 1 in FIG. 1.

FIG. 2 is a block diagram of a configuration of the controller 1 in FIG. 1.

As illustrated in FIG. 2, the controller 1 includes a three-phase/dq current converter 11, a current controller 12, a dq/three-phase voltage converter 13, a gate signal generator 14, and a triangular wave generator 15. With these functions, the controller 1 creates gate command signals Gup, Gun, Gyp, Gvn, Gwp, and Gwn, respectively, for the semiconductor switching elements Sup, Sun, Svp, Svn, Swp, and Swn, which are the PWM signals (FIG. 1) for use in driving and controlling the inverter main circuit 31 in the inverter 3, in accordance with the detected three-phase ACs Iu, Iv, and Iw and rotational position θ, and a d-axis current command Id* and a q-axis current command Iq* of the motor 2. Then, the controller 1 outputs the gate command signals Gup, Gun, Gyp, Gvn, Gwp, and Gwn.

In this example, the controller 1 is implemented by a computer system such as a microcomputer, which executes a predetermined program to function as the individual units in FIG. 2. The controller 1 employs a vector control method using rotation coordinates (dq coordinates).

The three-phase/dq current converter 11 calculates dq-converted d-axis current value Id and q-axis current value Iq, from the detected U-phase AC Iu, V-phase AC Iv, W-phase AC Iw, and rotational position θ.

The current controller 12 calculates a d-axis voltage command Vd* and a q-axis voltage command Vq* in a way that the d-axis current value Id and the q-axis current value Iq coincide, respectively, with a d-axis current command Id* and a q-axis current command Iq* that a host control device has created in accordance with a target torque.

The dq/three-phase voltage converter 13 calculates a U-phase voltage command value Vu*, a V-phase voltage command value Vv*, and a UW-phase voltage command value Vw*, which are UVW-converted three-phase voltage command values, from the d-axis voltage command Vd*, the q-axis voltage command Vq*, and the rotational position θ. Then, the dq/three-phase voltage converter 13 outputs the U-phase voltage command value Vu*, the V-phase voltage command value Vv*, and the UW-phase voltage command value Vw*.

The gate signal generator 14 compares each of the U-phase voltage command value Vu*, the V-phase voltage command value Vv*, the W-phase voltage command value Vw*, all of which have been output from the dq/three-phase voltage converter 13, with a triangular wave Tr, which has been output from the triangular wave generator 15, namely, performs the PWM, thereby generating the gate command signals Gup, Gun, Gyp, Gvn, Gwp, and Gwn, each of which is a pulsed voltage. In this case, the gate command signals Gup, Gyp, and Gwp for high-side arms (Sup, Svp, and Swp) are logically inverted to generate the gate command signals Gun, Gvn, and Gwn for low-side arms (Sun, Svn, and Swn).

As will be described later, the triangular wave generator 15 generates the triangular wave Tr by which carrier frequencies fc1 and fc2 different from each other are set as carrier frequencies so as to have proportions according to a motor rotation speed ωr. The motor rotation speed ωr is calculated from the rotational position θ by a differentiator (dθ/dt). In this example, the controller 1 includes the differentiator; however, the present invention is not limited to this. Alternatively, the rotational position detector 41 (FIG. 1) may include the differentiator to detect the rotational position θ and the motor rotation speed ωr.

These gate command signals Gup, Gun, Gyp, Gvn, Gwp, and Gwn are given to the control terminals (gates) of the individual semiconductor switching elements that constitute the inverter main circuit 31 (FIG. 1) via the PWM signal output means 32 (FIG. 1), and the turn-on or turn-off of each semiconductor switching element is thereby controlled. In this way, the inverter main circuit 31 converts the DC power into the AC power and outputs it, and at the same time, the magnitude and frequency of the output voltage of the inverter main circuit 31 are controlled.

When controlling the rotation speed of the motor 2, the motor control device 6 creates a voltage command or a current command in a way that the motor rotation speed ωr coincides with a speed command from the host control device. When controlling the motor output torque, a mathematical formula or a map that indicates a relationship between the d-axis current value Id, the q-axis current value Iq, and the motor torque is used to create the d-axis current command Id* and the q-axis current command Iq*.

Next, the triangular wave generator will be described.

Figure 3:
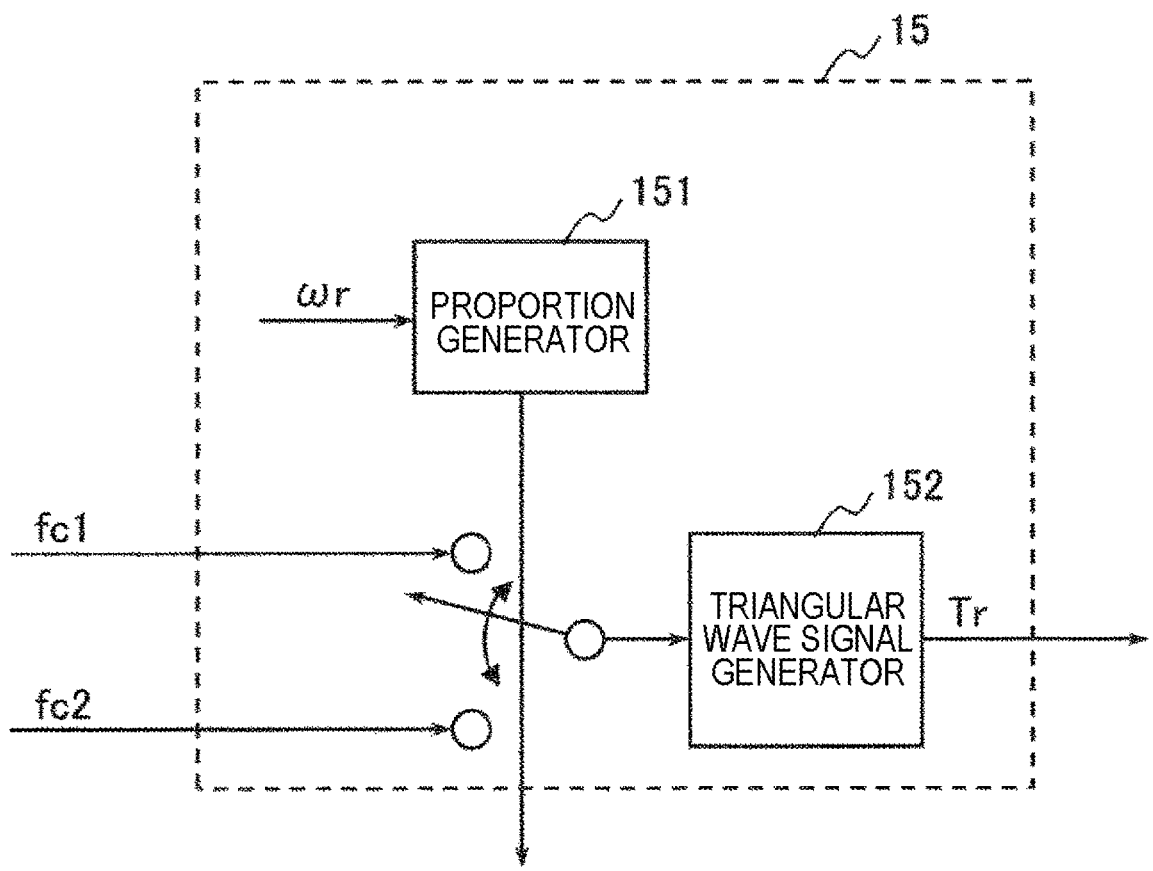
FIG. 3 is a block diagram of a configuration of a triangular wave generator in FIG. 2.

FIG. 3 is a block diagram of a configuration of the triangular wave generator 15 in FIG. 2.

The triangular wave generator 15 includes a proportion generator 151 and a triangular wave signal generator 152.

The proportion generator 151 varies proportions of the first carrier frequency fc1 and the second carrier frequency fc2 (>fc1), in accordance with the motor rotation speed ωr; both of the first carrier frequency fc1 and the second carrier frequency fc2 are set as the carrier signals under the PWM control.

In a low-speed range of ωr, the proportion of fc1 is set to 100% (the proportion of fc2 is set to 0%), and the proportion generator 151 selects only fc1 from fc1 and fc2. To switch from fc1 to fc2 upon stepping out of the low-speed range, the proportion generator 151 alternately selects fc1 and fc2 so as to vary the proportions of fc1 and fc2, depending on a variation in the motor rotation speed ωr and in accordance with a preset relationship between the proportions of fc1 and fc2 and the motor rotation speed ωr. Then, in a predetermined-speed range following the low-speed range, the proportion of fc2 is set to 100% (the proportion of fc1 is set to 0%), and the proportion generator 151 selects only fc2 from fc1 and fc2. To switch from fc2 to fc1, the proportion generator 151 alternately selects fc1 and fc2 in a manner that is the same as the way of switching from fc1 to fc2.

The triangular wave signal generator 152 generates the triangular wave signal Tr having the carrier frequencies selected by the proportion generator 151. Instead of the triangular wave used in this example, the waveform of the carrier signal may be a sawtooth wave.

Figure 4:
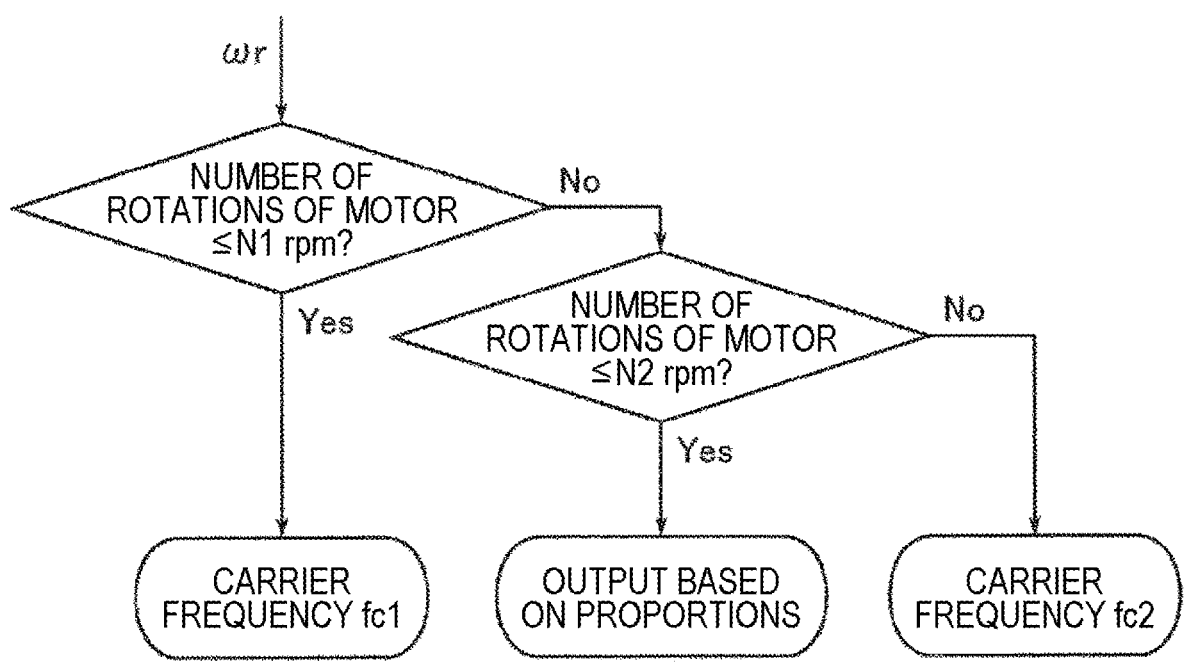
FIG. 4 is a flowchart of a process in which a proportion generator determines proportions of carrier frequencies.

FIG. 4 is a flowchart of a process in which the proportion generator 151 of FIG. 3 determines the proportions of the carrier frequencies.

First, the proportion generator 151 determines whether the number of rotations (ωr) of the motor is smaller than or equal to a predetermined number of rotations N1. Then, when it is smaller than or equal to N1 (Yes), the proportion generator 151 sets the carrier frequency of the inverter to a relatively low frequency, or fc1, in order to protect the semiconductor switching elements constituting the inverter main circuit.

When the number of rotations of the motor is larger than the predetermined number of rotations N1 (No), the proportion generator 151 in turn determines whether the number of rotations (ωr) of the motor is smaller than or equal to a predetermined number of rotations N2 (N2>N1). When it is smaller than or equal to N2 (Yes), the carrier frequency is alternately set to fc1 and fc2 (fc1<fc2), based on predetermined proportions of carrier frequency elements according to the number of rotations of the motor.

When the number of rotations of the motor is larger than the predetermined number of rotations N2 (No), the proportion generator 151 sets the carrier frequency to fc2, which is higher than fc1, in order to improve the efficiency of the motor control device and ensure controllability of high-speed rotations.

Each of the first carrier frequency fc1 and the second carrier frequency fc2 may be varied in accordance with the motor current in order to prevent the semiconductor switching elements in the inverter from being damaged. Alternatively, fc2 may be set to an integral multiple of fc1 (fc2=nfc2: n=2, 3, . . . ), so that subharmonic components are generated.

Figure 5:
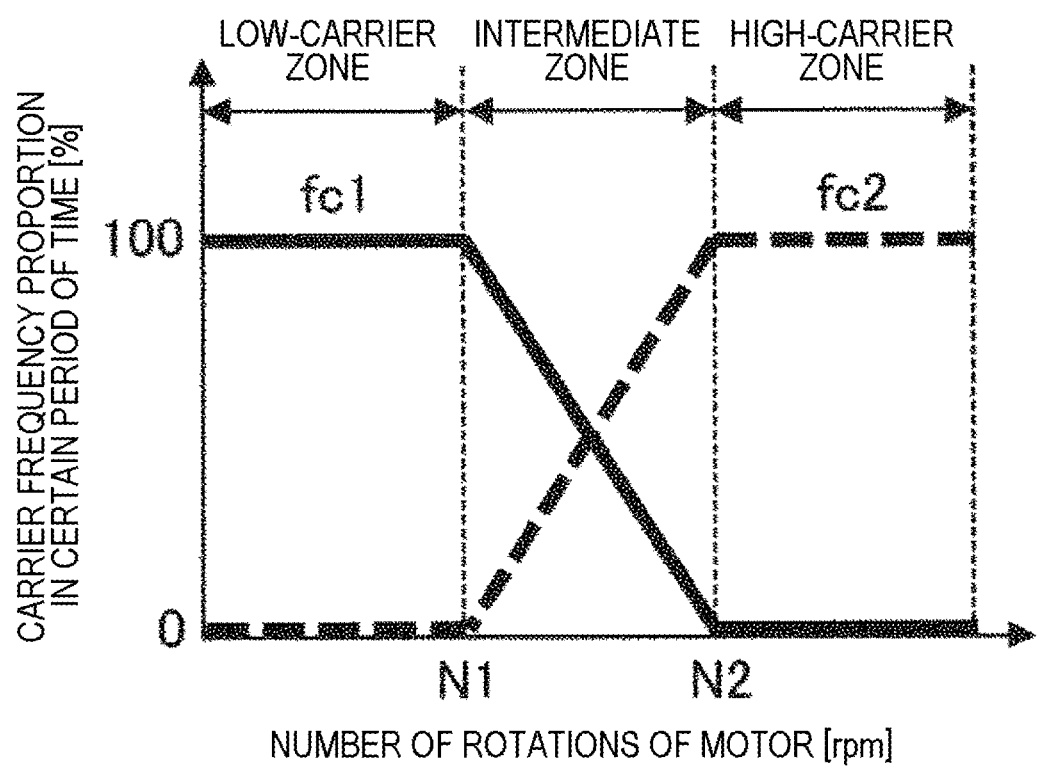
FIG. 5 illustrates a relationship between the number of rotations of a motor and set proportions of the carrier frequencies.

FIG. 5 illustrates a relationship between the number of rotations of the motor and set proportions of the carrier frequencies. The vertical axis represents a carrier frequency proportion (i.e., the percent of each carrier frequency) in a certain period of time; the horizontal axis represents the number of rotations of the motor (equivalent to the motor rotation speed ωr).

In this example, as illustrated in FIG. 5, the proportions of fc1 and fc2 (total 100%) are set to 100% and 0%, respectively, in the low-speed range of the number of rotations of the motor from zero to the predetermined value N1. When the number of rotations of the motor is larger than the predetermined value N1 and smaller than or equal to the predetermined value N2 (>N1), the carrier frequency proportions are varied dynamically and linearly (linear-functionally) in accordance with the number of rotations of the motor. In this case, as the number of rotations of the motor increases from N1 to N2, the proportion of fc1 gradually decreases from 100% to 0%, and the fc2 proportion gradually increases from 0% to 100%. In the speed range where the number of rotations of the motor is larger than the predetermined value N2, the proportions of fc1 and fc2 are set to 0% and 100%, respectively.

If the controller 1 is implemented by a microcomputer, the proportions of fc1 and fc2 are controlled in a digital manner and thus set in a discrete manner. In this case, by finely varying the proportions of fc1 and fc2 within a calculation accuracy range of the microcomputer, the proportions can be varied substantially dynamically.

FIG. 6 illustrates an example of waveforms of a triangular wave carrier signal and a voltage command to be output from the triangular wave signal generator 152 in FIG. 3. The relationship between the number of rotations of the motor and set proportions of the carrier frequencies, illustrated in FIG. 5, is also described. In this case, fc2=2fc1 (e.g., fc1=5 kHz, and fc2=10 kHz).

The individual waveform examples are waveforms in cases of the proportions at the time points A, B, C, D, and E, at which the proportions of fc1 and fc2 satisfy the relationship between the number of rotations of the motor and the set proportion of each carrier frequency. In this case, if the proportions of fc1 and fc2 are denoted by r1[%] and r2[%], respectively, a pair (r1, r2) of r1 and r2 becomes (100, 0) at the time point A, (75, 25) at B, (50, 50) at C, (25, 75) at D, and (0, 100) at E.

As can be seen from the waveform examples, the proportion of r1 decreases and the proportion of r2 increases in the order of A, B, C, D, and E, so that the duration of fc1 (the time of consecutive fc1 period) becomes shorter and the duration of fc2 (time of consecutive fc2 period) becomes longer. The proportions of the durations of fc1 and fc2 following fc1 are equivalent to the proportions (r1, r2) of fc1 and fc2.

For example, if the cyclic frequencies (the numbers of cycles) in the durations of fc1 and fc2 are denoted by c1 and c2, respectively, (c1, c2) is (3, 2) at B, (1, 2) at C, and (1, 6) at D. If this is converted into the duration under the condition that the period in the case of fc2 is denoted by T (thus, the period in the case of fc1 is 2T), the duration becomes (6T, 2T), (2T, 2T), and (2T, 6T). In this way, the proportions in the duration at B, C, and D are related to the above-described proportions of fc1 to fc2 (75, 25), (50, 50), and (25, 75).

As in the waveform examples of FIG. 6, each of the durations related to the proportions of fc1 and fc2 may be set to one or more cycles. In this case, for example, as in the waveform examples of FIG. 6, each repetition period may be set so that a ratio between repetition periods (the numbers of cycles) of fc1 and fc2 becomes a simple integer ratio (an integer ratio that does not have a common divisor). As a result, the proportions of fc1 and fc2 become uniform in the entire waveform of the triangular wave, so that it is possible to suppress switching noise.

FIG. 7 illustrates gate command signals that the gate signal generator 14 (FIG. 2) performs PWM to generate by using the triangular wave carrier signal and the voltage command illustrated in FIG. 6. Similar to FIG. 6, FIG. 7 also illustrates the relationship between the number of rotations of the motor and the set proportions of the carrier frequencies.

As described above, the proportions of fc1 and fc2 are varied dynamically and linearly, and thus the duty cycle of the gate command signal does not vary at the time points A, B, C, D, and E. Therefore, it is possible to vary a switching frequency in accordance with the proportions of fc1 and fc2 without affecting an AC three-phase voltage to be output. Consequently, it is possible to suppress switching noise to be made in response to the switching of the carrier frequency.

In Example 1 as described above, the inverter rotates the motor under the PWM control using the carrier signal of the carrier frequency fc2. In the low-speed range where the motor rotation speed ωr is less than or equal to the predetermined value N1, the carrier frequency is set to fc1, which is lower than fc2. When fc1 and fc2 are switched, carrier frequencies are set to fc1 and fc2, and the proportions of fc1 and fc2 to be set are varied in accordance with the motor rotation speed ωr. Consequently, it is possible to suppress a switching noise by reducing fluctuations of three-phase current pulsations in response to the switching of the carrier frequency, with semiconductor switching elements constituting an inverter main circuit being protected from being damaged in a low-speed range of a motor.

In this example, the proportions of fc1 and fc2 are varied dynamically and linearly, depending on the motor rotation speed ωr, and the carrier frequency is thereby switched quietly between fc1 and fc2. Consequently, it is possible to reduce a switching noise effectively.

Note that, regarding variations in the proportions of fc1 and fc2 depending on the number of rotations of the motor (motor rotation speed) as illustrated in FIG. 5, hysteresis may be provided when fc1 is switched to fc2 or when fc2 is switched to fc1. This can prevent current pulsations from being generated by a rapid change in the number of rotations of the motor.

The timing of detecting the currents (Iu, Iv, and Iw: in FIGS. 1 and 2) may be changed depending on a carrier frequency and control cycle of a triangular wave signal generated by the triangular wave signal generator 152 (FIG. 3). This situation is illustrated in FIG. 8.

FIG. 8 illustrates triangular wave signal waveforms and U-phase current waveforms. In this drawing, the white dots each indicate a current detection timing.

As illustrated in the left drawing, when the carrier frequency is high, such as when the carrier cycle is shorter than twice that of the control cycle as illustrated in the drawing, the current is detected at the timings of only one of the "crest" and the "trough" of the carrier signal (timing of the "trough" in the left diagram of FIG. 8), in consideration of performance of a microcomputer implementing a controller and an influence of a calculation load of the microcomputer. As illustrated in the right drawing, when the carrier frequency is low, such as when the carrier cycle is twice or more as long as that of the control cycle as illustrated in the drawing, the current can be detected at the timings of both the "crest" and the "trough" of the carrier signal. This can improve current detection accuracy at low carrier frequencies, thereby averaging current pulsations and removing offsets. Consequently, it is possible to reduce current pulsations involved at low carrier frequencies and related motor vibration and other noises.

Example 2

Next, a motor control device according to Example 2 of the present invention will be described. In Example 2, the means for setting proportions of carrier frequencies differs from that in Example 1, but other configurations are the same as those in Example 1. Therefore, differences from Example 1 will be mainly described below.

Figure 9:
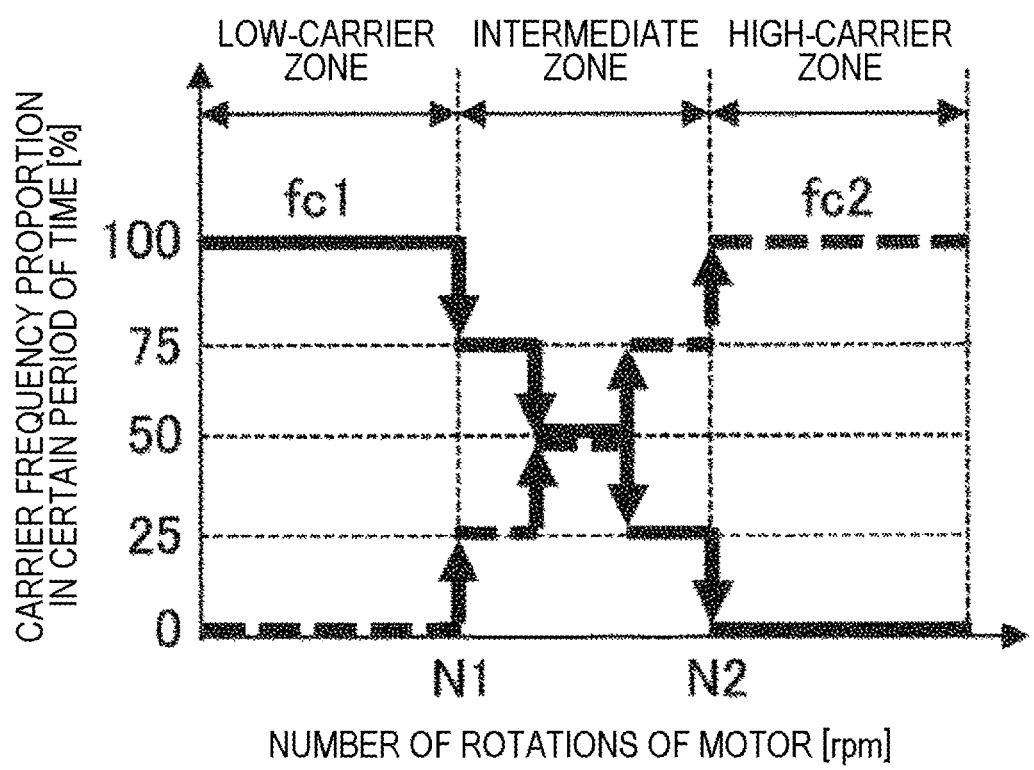
FIG. 9 illustrates a relationship between the number of rotations of a motor and set proportions of carrier frequencies, according to Example 2.

FIG. 9 illustrates a relationship between the number of rotations of a motor and set proportions of carrier frequencies according to Example 2. The vertical axis represents a carrier frequency proportion (i.e., the percent of each carrier frequency) in a certain period of time; the horizontal axis represents the number of rotations of the motor (equivalent to the motor rotation speed ωr).

In Example 2, unlike Example 1 (FIG. 5), the proportions (total 100%) of the carrier frequencies fc1 and fc2 are varied in a stepwise manner or in a plurality of steps and in accordance with the number of rotations of a motor.

If the proportions of fc1 and fc2 are set to r1 [%] and r2 [%] (r1+r2=100), respectively, a proportion pair of (r1, r2) of fc1 and fc2 is set to (100, 0) in a low-speed range where the number of rotations of the motor is from zero to a predetermined value N1, as illustrated in FIG. 9. At the number of rotations N1 (predetermined value) of the motor, (r1, r2) is varied from (100, 0) in the low-speed range to (75, 25). As the number of rotations of the motor increases from N1 to N2, (r1, r2) is sequentially varied from (75, 25) to (50, 50) and from (50, 50) to (25, 75). Then, at the number of rotations N2 (predetermined value) of the motor, (r1, r2) is varied from (25, 75) to (0, 100), and is set to (0, 100) in the speed range where the number of rotations of the motor is higher than N2.

Values of the number of rotations of the motor at which the proportions of fc1 and fc2 are varied in the speed range between the number of rotations N1 and N2 of the motor are preset. The number of rotations of the motor at which the proportions of fc1 and fc2 are varied and changed values of the proportions of fc1 and fc2 are set such that the proportions of fc1 and fc2 are roughly linearly varied depending on the number of rotations of the motor between the number of rotations N1 and N2 of the motor.

Figure 10:
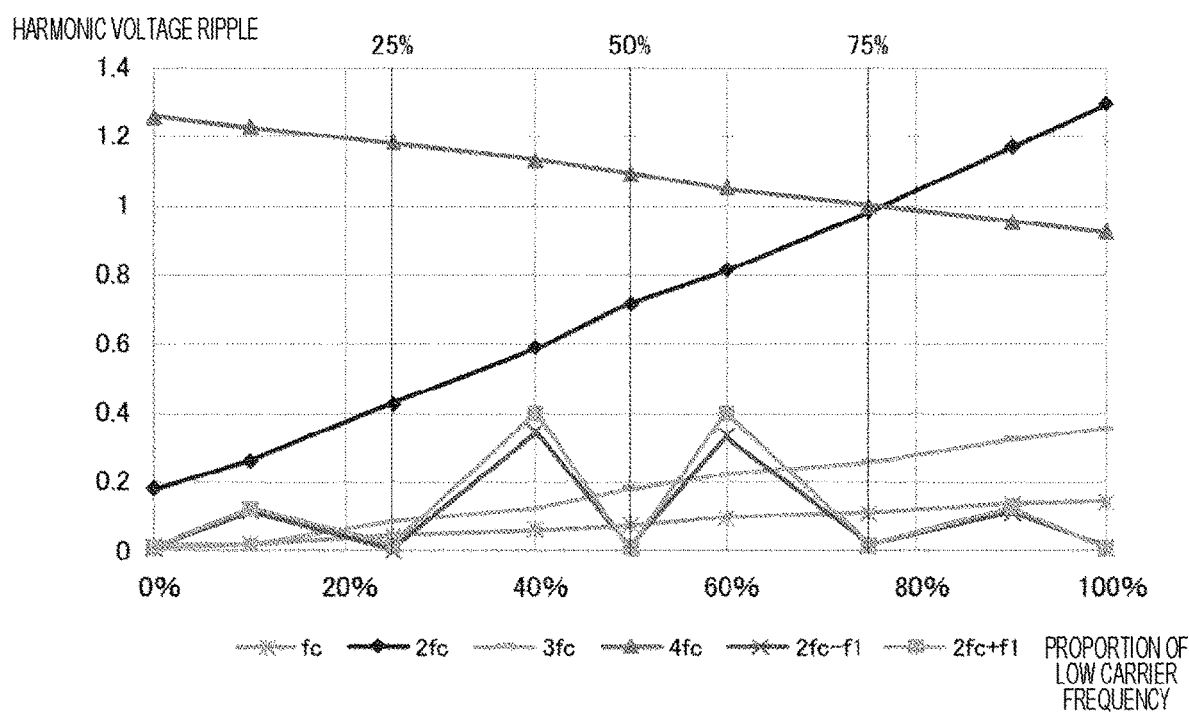
FIG. 10 illustrates a relationship between the proportion of a low carrier frequency and harmonics, according to Example 2.

FIG. 10 illustrates a relationship between the proportion of a low carrier frequency (fc1) and harmonics according to Example 2.

In FIG. 10, the horizontal axis represents a proportion (percent) of a low carrier frequency; the vertical axis represents a magnitude of a harmonic voltage ripple. It should be noted that FIG. 10 illustrates an example of a result studied by the present inventor under the condition that, for the sake of simplification, the number of rotations of the motor is set to zero, fc1=fc, fc2=2fc, and a control frequency (=the reciprocal of a control cycle) is set to f1.

In FIG. 10, the magnitudes of the harmonic voltages of the frequency components fc, 2fc, 3fc, and 4fc vary linearly and substantially continuously with the proportion (percent) of the low carrier frequency. In contrast, the magnitudes of the harmonic voltages of the frequency components 2fc±f1 generated by switching repetitions vary discontinuously. The harmonic voltages of the frequency components 2fc±f1 approach zero when the proportions of the low carrier frequency are 0%, 25%, 50%, 75%, and 100%. Thus, as illustrated in FIG. 9, a proportion pair (r1, r2) of fc1 and fc2 is set in five stages to (100, 0), (75, 25), (50, 50), (25, 75), and (0, 100). The magnitudes of vibration and noise thereby can be varied linearly, that is, relatively quietly in accordance with the motor rotation speed, with the number of times that each proportion is varied being reduced. Therefore, according to this example, switching noise can be reduced.

According to Example 2, performance of a computer system, such as a microcomputer implementing the controller 1 (FIG. 1) may be standard. Consequently, it is possible to reduce the motor control device or cost of the motor control device.

Example 3

Next, a motor control device according to Example 3 of the present invention will be described. In Example 3, the method of setting the carrier frequency differs from that in Example 1, but other configurations are the same as those of Example 1. Therefore, differences from Example 1 will be mainly described below.

Figure 11:
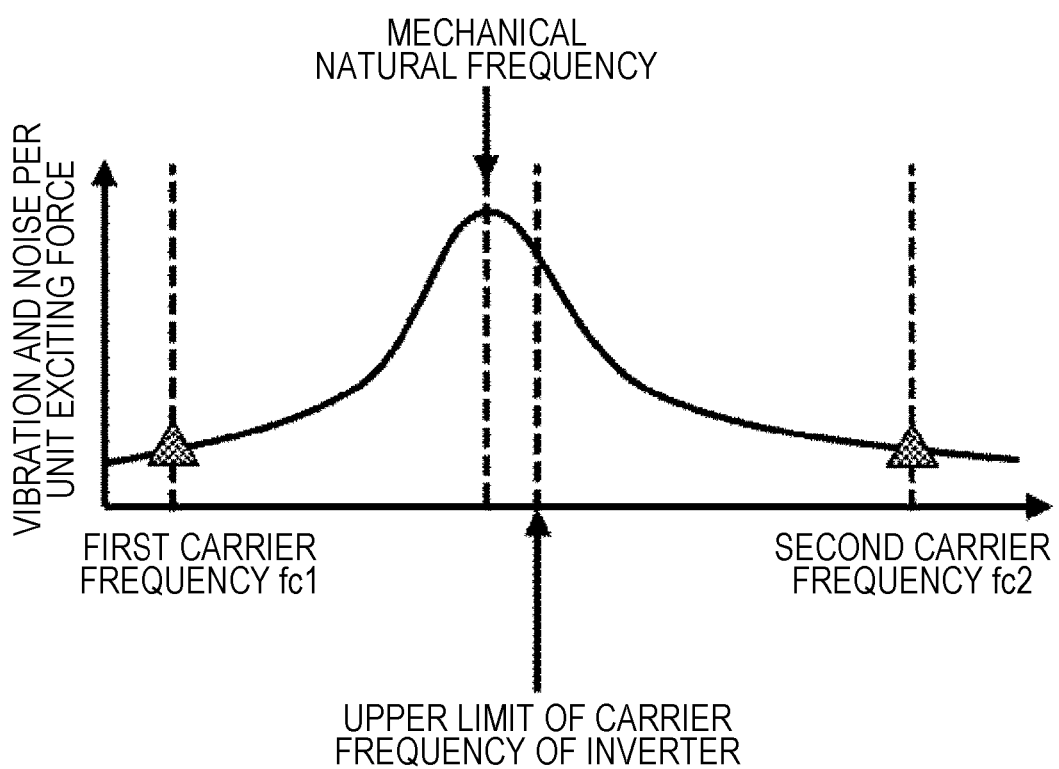
FIG. 11 illustrates mechanical resonance characteristics of a motor, according to Example 3.

FIG. 11 illustrates mechanical resonance characteristics of a motor, according to Example 3. In FIG. 11, the vertical axis represents an intensity of vibration and noise per unit exciting force; the horizontal axis represents a vibration frequency.

As illustrated in FIG. 11, in Example 3, a first carrier frequency fc1 is set to a frequency lower than a natural frequency of a motor mechanism (mechanical parts such as a case housing and a stator core), whereas a second carrier frequency fc2 is set to a frequency higher than the natural frequency.

The motor mechanism is vibrated mainly by electromagnetic excitation force that is generated by energization of the motor. A plurality of vibration modes are present in the vibration of the motor mechanism, and the values of their natural frequencies may differ from each other. FIG. 11 illustrates, as the natural frequency, the natural frequency of the vibration mode having the highest vibration intensity.

By setting fc1 and fc2 to respective frequencies different from the natural frequency of the motor mechanism, the frequency of the electromagnetic excitation force is displaced away from the natural frequency. This can suppress vibration and noise of the motor mechanism caused by the electromagnetic excitation force.

Figure 12:
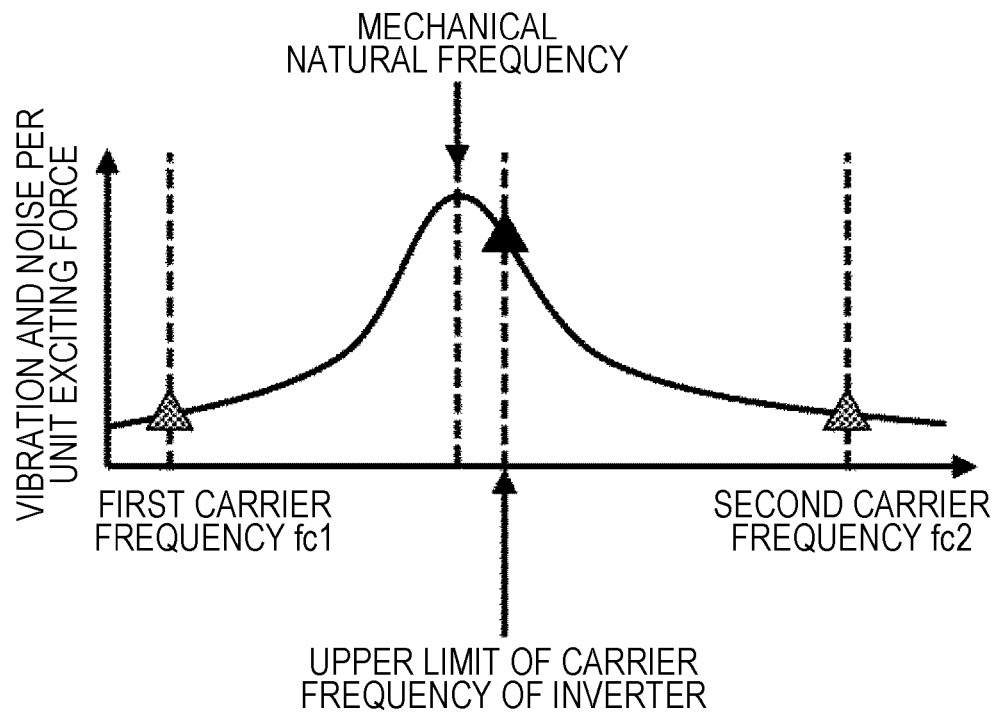
FIG. 12 illustrates vibration and noise levels at fc1, fc2, and the upper limit of a carrier frequency of an inverter, according to Example 3.
Figure 12:
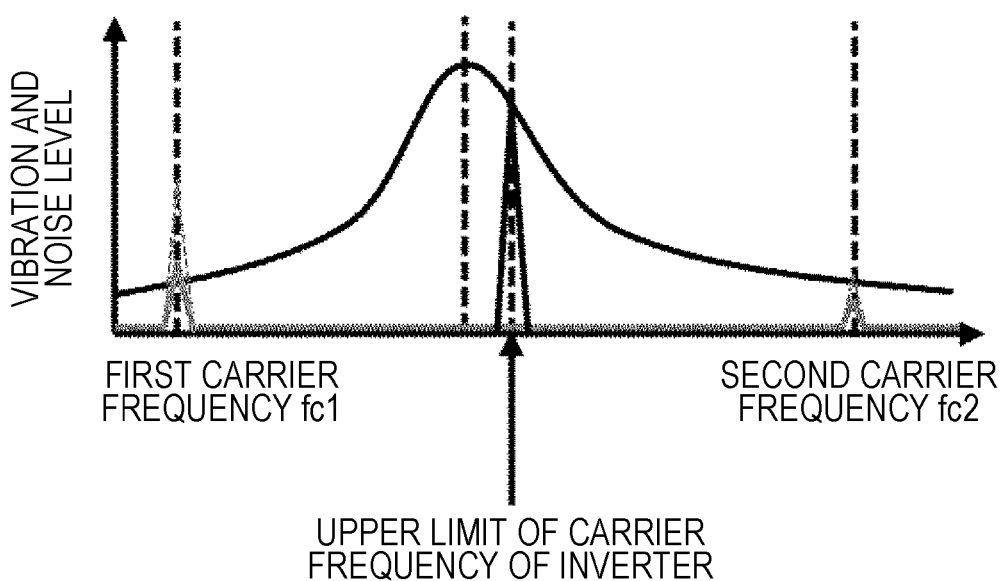

FIG. 12 (lower diagram) illustrates the vibration and noise levels at fc1, fc2, and the upper limit of the carrier frequency of the inverter, according to Example 3. The proportions of fc1 and fc2 are set to 50% and 50%, respectively. In addition, a resonance curve is also illustrated in the drawing, and the relationship illustrated in FIG. 11 is also illustrated as the upper drawing.

The upper limit of the carrier frequency is set to the upper limit of the switching frequency at which semiconductor switching elements constituting an inverter main circuit can perform switching without being damaged during acceleration or deceleration of the motor (torque is large and motor current is large).

As illustrated in FIG. 12, in Example 3, fc1 is set to a frequency lower than the upper limit of the carrier frequency of the inverter, whereas fc2 is set to a frequency lower than the upper limit of the carrier frequency of the inverter.

The upper limit of the carrier frequency of the inverter is closer to the natural frequency of the motor mechanism than any of fc1 and fc2. In Example 3, the upper limit of the carrier frequency of the inverter is higher than the natural frequency of the motor mechanism; however, it may be lower.

The vibration and noise level at the upper limit of the carrier frequency of the inverter is used as a reference. At the first carrier frequency fc1, the current ripple increases with the decrease in the carrier frequency, thereby making the vibration and noise level higher. In Example 3, setting the proportions of fc1 and fc1 causes the vibration and noise level to be as illustrated in FIG. 12 (lower drawing). At the second carrier frequency fc2 (>fc1), the current ripple decreases with the increase in the carrier frequency, thereby making the vibration and noise level lower. In Example 3, setting of the proportions of fc1 and fc2 in combination causes the vibration and noise level to be as illustrated in FIG. 12 (lower drawing).

By setting the proportions of fc1 and fc2 in this manner, it is possible to reduce the vibration and noise of the motor without damaging the semiconductor switching elements even if the upper limit of the carrier frequency during the acceleration or deceleration of the motor is not considered.

As described above, according to Example 3, it is possible to reduce the vibration and noise of the motor caused by the electromagnetic excitation force without damaging the semiconductor switching elements.

The proportions of fc1 and fc1 may be varied appropriately in accordance with the value of the natural frequency of the vibration mode that has the biggest influence on the vibration and noise of the motor mechanism or in accordance with the upper limit of the carrier frequency as described above.

A so-called carrier spread spectrum may also be employed, by which the peak values of noise and vibration of the electromagnetic excitation force are reduced by slightly changing the carrier frequency around fc1 and fc2 within a predetermined spread width range, namely by performing spread spectrum.

Example 4

Next, a motor control device according to Example 4 of the present invention will be described. In Example 4, the means for setting proportions of carrier frequencies differs from that in Example 1, but other configurations are the same as those of Example 1. Therefore, differences from Example 1 will be mainly described below.

In general, a motor is driven in a variable speed driving manner, and an electrical angular frequency f1 of the motor varies accordingly. It is known that a frequency of noise generated by electromagnetic excitation force associated with a carrier, which varies depending on the number of rotations of the motor, is expressed as n·fc±m·f1 (n and m each denote a positive integer), where fc denotes a carrier frequency. For example, when a distributed winding three-phase synchronous motor is used, noise frequencies become fc±3f1.

Figure 13:
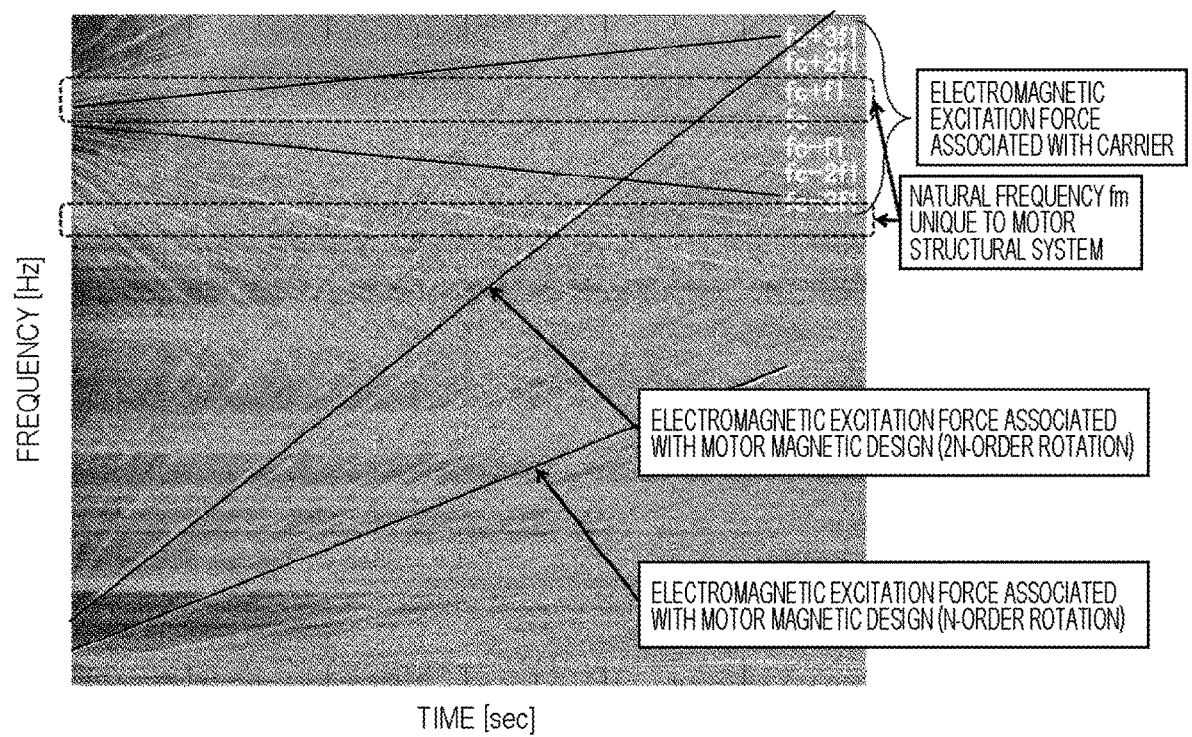
FIG. 13 is an example of a result of measuring time variations in frequencies of the electromagnetic excitation forces when the carrier frequency is denoted by fc.

FIG. 13 is an example of a result of measuring time variations in frequencies of the electromagnetic excitation forces when the carrier frequency is denoted by fc. Those time variations are illustrated in terms of the electromagnetic excitation forces associated with the carrier and the electromagnetic excitation forces associated with a motor magnetic design.

As illustrated in FIG. 13, the frequencies of the electromagnetic excitation forces associated with the carrier, that is, the frequencies of the electromagnetic noises generated by those electromagnetic excitation forces increase or decrease because the number of rotations of the motor increases and f1 increases with time. For example, the frequency of the noise of the frequency fc−3f1 decreases with time because f1 increases, and at a certain time point, this frequency coincides with a natural frequency fm of a motor structural system and produces resonance, making the noise louder. In short, even if fc1 and fc2 are set differently from the natural frequency of the motor, fc2−3f1 coincides with the natural frequency when f1 increases and produces the resonance, making electromagnetic noise louder.

In Example 4, as described below, the electromagnetic noise made by the electromagnetic excitation force associated with the carrier during such variable speed driving is reduced.

Figure 14:
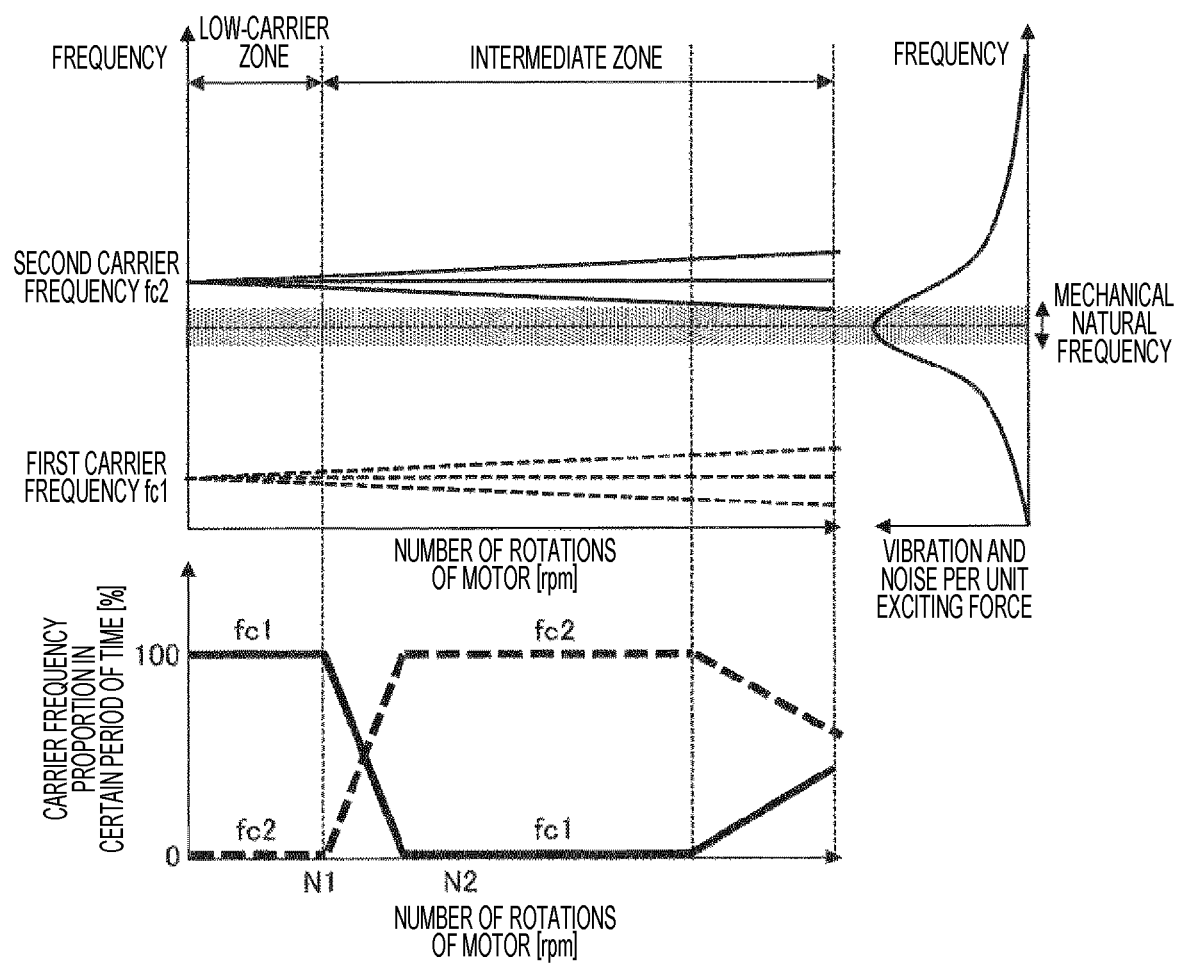
FIG. 14 illustrates a relationship between the number of rotations of a motor and set proportions of carrier frequencies according to Example 4.

FIG. 14 (lower drawing) illustrates a relationship between the number of rotations of the motor and set proportions of the carrier frequencies, according to Example 3. The vertical axis represents a carrier frequency proportion (i.e., the percent of each carrier frequency) in a certain period of time; the horizontal axis represents the number of rotations of the motor (equivalent to the motor rotation speed or). The drawing (upper drawing) also illustrates the time variations in fc1 and fc2 (fc1 and fc2 are constant), the frequencies fc1±m·f1 and fc2±m·f1 of sideband waves of the carrier signal over time, and mechanical resonance characteristics of the motor mechanism (corresponding to FIG. 11).

As illustrated in FIG. 14, fc2 is set to a frequency higher than the natural frequency of the motor mechanism (near the resonance peak in FIG. 14), but the frequency fc2-$m$·f1 of the sideband wave coincides with the natural frequency fm when the number of rotations of the motor increases because fc2 is closer to the natural frequency than fc1.

In Example 4, when the number of rotations of the motor is in the range from 0 to N2, the proportions of fc1 and fc2 are set in a manner that is the same as that in Example 1 described above (FIG. 5). When the number of rotations of the motor exceeds N2, f1 increases. Then, when fc2-$m$·f1 coincides with the natural frequency fm, the proportion of fc2 decreases, and the proportion of fc1 increases accordingly. In this way, the electromagnetic noise can be reduced.

In Example 3, as the number of rotations of the motor increases, the proportion of fc2 increases dynamically and linearly but the proportion of fc1 decreases dynamically and linearly, within a predetermined frequency range centered on the natural frequency (resonance frequency) near the resonance peak. Note that each proportion may be varied in a stepwise manner as in Example 2 (FIG. 9).

According to Example 4, as described above, it is possible to suppress the vibration and noise of the motor over the entire speed range of the motor.

Example 5

Next, a description will be given of a hybrid vehicle system, which is an example of an electric vehicle system using the motor control device according to the present invention.

Figure 15:
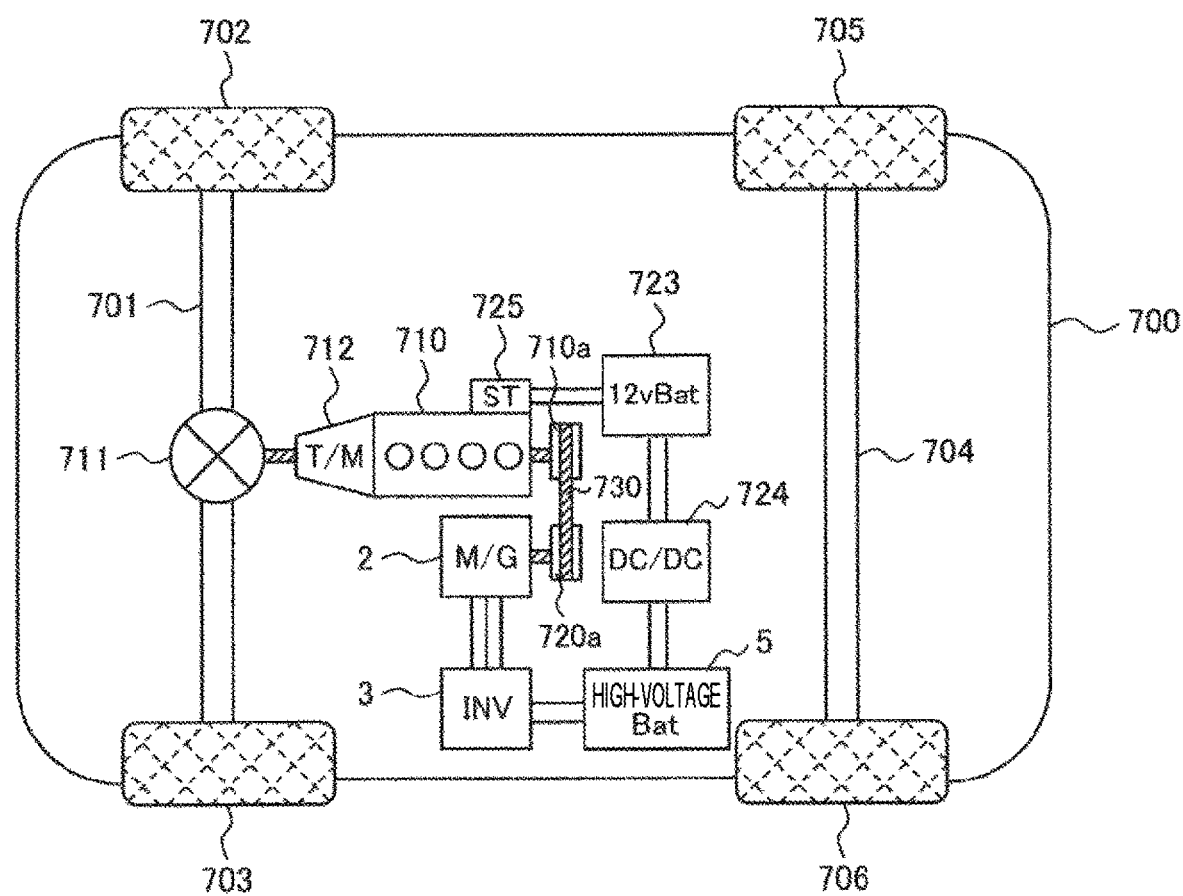
FIG. 15 is a configuration diagram of a hybrid vehicle system according to Example 5.

FIG. 15 is a configuration diagram of a hybrid vehicle system according to Example 5 of the present invention.

The hybrid vehicle system includes a power train employing a motor 2 as a motor/generator, as illustrated in FIG. 15. In addition, the hybrid vehicle system causes an engine 710 and the motor 2 to serve as a drive power source for wheels.

As illustrated in FIG. 15, a front-wheel shaft 701 that is rotatably supported in a front portion of a vehicle body 700 is provided with front wheels 702 and 703 at both ends. A rear-wheel shaft 704 that is rotatably supported in a rear portion of the vehicle body 700 is provided with rear wheels 705 and 706 at both ends.

A differential gear 711, which is a power distribution mechanism, is provided at the center of the front-wheel shaft 701. Rotational drive transmitted from the engine 710 via a transmission 712 is distributed to the right/left front-wheel shaft 701 by the differential gear 711.

A pulley 710a, which is provided in a crankshaft of the engine 710, and a pulley 720a, which is provided in a rotating shaft of the motor 2, are mechanically coupled together via a belt 730. As a result, the rotational driving force of the motor 2 can be transmitted to the engine 710, and the rotational driving force of the engine 710 can be transmitted to the motor 2.

In the motor 2, three-phase AC power controlled by an inverter 3 is supplied to a stator coil of a stator, and a rotor thereby rotates to generate rotational driving force in accordance with the three-phase AC power. The motor 2 operates as an electric motor under the control of the inverter 3, and the rotor is rotated by receiving the rotational driving force from the engine 710, so that electromotive force is induced in the stator coil of the stator. In this way, the motor 2 operates as an electric motor that generates the three-phase AC power.

The inverter 3 is a power converter that converts DC power supplied from a high-voltage battery 5 serving as a high-voltage (42V or 300V) power supply into the three-phase AC power. The inverter 3 controls the three-phase AC flowing through the stator coil of the motor 2, depending on a magnetic pole position of the rotor and in accordance with an operation command value.

The three-phase AC power generated by the motor 2 is converted, by the inverter 3, into the DC power, which then charges the high-voltage battery 5. The high-voltage battery 5 is electrically connected to a low-voltage battery 723 via a DC-DC converter 724. The low-voltage battery 723 implements a low-voltage (e.g., 12V) power source of an automobile and is used as a power source for a starter 725 that initially starts (cold starting) the engine 710, a radio, and a light, and other components.

While a vehicle is stopping (in an idle-stop mode) such as waiting for a traffic light, the engine 710 is stopped. When the engine 710 is resumed (hot starting) to run the vehicle again, the inverter 3 drives the motor 2 to resume the engine 710. If the charged amount of the high-voltage battery 5 is insufficient or the engine 710 is not yet sufficiently warmed up in an idle-stop mode, the engine 710 is continuously driven without being stopped. In an idle-stop mode, a drive source for auxiliary equipment such as an air conditioner compressor whose drive source is engine 710 is secured. In this case, the motor 2 is driven to drive the auxiliary equipment.

In an acceleration mode or a high-load operation mode, the motor 2 is also driven to assist the driving of the engine 710. In a charging mode for charging the high-voltage battery 5, the engine 710 causes the motor 2 to generate electric power to charge the high-voltage battery 5. In this case, that is, during the stop or deceleration of the vehicle, the inverter 3 operates in a regenerative mode.

In Example 5, any of Examples 1 to 4 is applied as a motor control device including the motor 2 and the inverter 3. This reduces electromagnetic noise, thereby successfully reducing a vibration-proof material, sound-proof material, and sound-insulating material to be attached to the vehicle body 700. Reducing those materials can improve fuel efficiency.

The motor control devices according to Examples 1 to 4 are each applicable to hybrid vehicle systems as well as electric automobile systems and other electric vehicle systems, in which case it is possible to produce the same effect as that of Example 5.

It should be noted that the present invention is not limited to the above-described examples, and includes various modifications. For example, the above-described examples have been described in detail in order to explain the present invention in an easy-to-understand manner, and the present invention is not necessarily limited to one having all of the described configurations. Furthermore, other configurations may be added to the configurations of each example, and some of the configurations of each example may be deleted or replaced.

For example, an inverter and a controller may be mounted inside a motor, to constitute a motor control device with an integrated configuration. In this case, a power supply line and signal line of a host control device are connected to the motor, in order to make the motor function as a motor control device.

The motor is not limited to a synchronous motor such as a three-phase synchronous motor; alternatively, it may be an induction motor such as a three-phase induction motor.

REFERENCE SIGNS LIST 1 controller
2 motor
3 inverter
4 rotational position sensor
5 high-voltage battery
6 motor control device
7 current detection means
11 three-phase/dq current converter
12 current controller
13 dq/three-phase voltage converter
31 inverter main circuit
32 PWM signal output means
33 smoothing capacitor
41 rotational position detector
151 proportion generator
152 triangular wave signal generator
700 car body
701 front-wheel shaft
702, 703 front wheel
704 rear-wheel shaft
705, 706 rear wheel
710 engine
710a pulley
711 differential gear
712 transmission
720a pulley
723 low-voltage battery
724 DC-DC converter
725 starter
730 belt

The invention claimed is:

1. A motor control device comprising:
a power converter that is controlled by a pulse width modulation signal;
a motor that is driven by the power converter; and
a controller that generates the pulse width modulation signal, based on a carrier signal, wherein
when switching between a first carrier frequency of the carrier signal and a second carrier frequency of the carrier signal, the controller varies proportions of the first carrier frequency and the second carrier frequency in accordance with a number of rotations of the motor, the second carrier frequency being higher than the first carrier frequency,
wherein neither the first carrier frequency nor the second carrier frequency coincides with a mechanical natural frequency of the motor, and
when a frequency of a sideband of the carrier signal coincides with the natural frequency, the proportions of the first carrier frequency and the second carrier frequency are varied in accordance with the number of rotations of the motor.

2. The motor control device according to claim 1, wherein the controller dynamically varies the proportions of the first carrier frequency and the second carrier frequency.

3. The motor control device according to claim 1, wherein the controller varies the proportions of the first carrier frequency and the second carrier frequency in a stepwise manner.

4. The motor control device according to claim 3, wherein a pair (r1, r2) of the proportion r1 [%] of the first carrier frequency and the proportion r2[%] of the second carrier frequency is set in five stages to (0, 100), (25, 75), (50, 50), (75, 25), and (100, 0).

5. The motor control device according to claim 4, wherein the controller sets in the five stages in accordance with the number of rotations of the motor.

6. The motor control device according to claim 1, wherein the controller decreases the proportion of the first carrier frequency and increases the proportion of the second carrier frequency as the number of rotations of the motor increases.

7. The motor control device according to claim 6, wherein
when the number of rotations of the motor is smaller than or equal to a predetermined first number of rotations, the proportion of the first carrier frequency is set to 100%, and the proportion of the second frequency is set to 0%,
when the number of rotations of the motor is equal to or larger than a predetermined second number of rotations that is higher than the first number of rotations of the motor, the proportion of the first carrier frequency is set to 0%, and the proportion of the second carrier frequency is set to 100%, and
when the number of rotations of the motor is equal to or larger than the first number of rotations and is smaller than or equal to the second number of rotations, the proportion of the first carrier frequency is decreased from 100% and the proportion of the second carrier frequency is increased by 0% as the number of rotations of the motor increases.

8. The motor control device according to claim 1, wherein the controller linearly varies the proportions of the first carrier frequency and the second carrier frequency in accordance with the number of rotations of the motor.

9. The motor control device according to claim 1, wherein the second carrier frequency is equal to an integral multiple ≥2 of the first carrier frequency.

10. The motor control device according to claim 1, wherein the controller alternately selects the first carrier frequency and the second carrier frequency in durations proportional to the respective proportions.

11. The motor control device according to claim 7, wherein
when neither the first carrier frequency nor the second carrier frequency coincides with a mechanical natural frequency of the motor, the second carrier frequency is closer to the natural frequency than the first carrier frequency, and
the frequency of the sideband of the carrier signal whose fundamental frequency is the second carrier frequency coincides with the natural frequency, the proportions of the first carrier frequency and the second carrier frequency are varied in accordance with the number of rotations of the motor.

12. The motor control device according to claim 1, wherein when switching from the first carrier frequency to the second carrier frequency or when switching from the second carrier frequency to the first carrier frequency, hysteresis is provided for a variation in each of the proportions.

13. The motor control device according to claim 1, wherein both of the first carrier frequency and the second carrier frequency are subjected to spectrum spreading.

14. The motor control device according to claim 1, wherein the timing of detecting a current flowing through the motor is changed in accordance with both of the first carrier frequency and the second carrier frequency.

15. The motor control device according to claim 1, wherein the motor is a three-phase synchronous motor.

16. An electric vehicle system comprising:
a vehicle body;
a wheel provided on the vehicle body;
a drive power source that drives the wheel, the drive power source including a motor;
a power converter that is controlled by a pulse width modulation signal and drives the motor; and
a controller that generates the pulse width modulation signal, based on a carrier signal, wherein
when switching between a first carrier frequency of the carrier signal and a second carrier frequency of the carrier signal, the controller varies proportions of the first carrier frequency and the second carrier frequency in accordance with a number of rotations of the motor, the second carrier frequency being higher than the first carrier frequency,
wherein neither the first carrier frequency nor the second carrier frequency coincides with a mechanical natural frequency of the motor, and
when a frequency of a sideband of the carrier signal coincides with the natural frequency, the proportions of the first carrier and the second carrier frequency are varied in accordance with the number of rotations of the motor.

* * * * *